United States Patent [19]

Kawamura et al.

[11] Patent Number: 5,227,429
[45] Date of Patent: Jul. 13, 1993

[54] POLY(ARYLENE SULFIDE) RESIN COMPOSITION

[75] Inventors: Takashi Kawamura, Ichihara; Yukio Imai, Yokohama; Kazuhiro Kawamata, Utsunomiya; Takayuki Okada, Kimitsu; Junichiro Furuta, Yokohama, all of Japan

[73] Assignee: Tohpren Co., Ltd., Tokyo, Japan

[21] Appl. No.: 795,381

[22] Filed: Nov. 21, 1991

Related U.S. Application Data

[63] Continuation-in-part of Ser. No. 515,571, Apr. 27, 1990, abandoned.

[30] Foreign Application Priority Data

Apr. 28, 1989 [JP] Japan .................. 1-107810

[51] Int. Cl.$^5$ .................. C08L 53/00; C08L 81/00
[52] U.S. Cl. .................. 525/92; 525/189; 525/537
[58] Field of Search .................. 525/92, 189, 537

[56] References Cited

U.S. PATENT DOCUMENTS

| | | | |
|---|---|---|---|
| 4,436,865 | 3/1984 | Beever | 525/92 |
| 4,451,607 | 5/1984 | Garcia et al. | 525/92 |
| 4,929,665 | 5/1990 | Inoue et al. | 525/537 |
| 5,075,381 | 12/1991 | Gotoh et al. | 525/189 |
| 5,137,938 | 8/1992 | Kohler et al. | 525/537 |

FOREIGN PATENT DOCUMENTS

| | | |
|---|---|---|
| 56-115355 | 4/1981 | Japan . |
| 63-191858 | 8/1988 | Japan . |
| 63-205358 | 8/1988 | Japan . |
| 01215854 | 8/1989 | Japan . |

*Primary Examiner*—Ralph H. Dean, Jr.
*Assistant Examiner*—Helen F. Lee
*Attorney, Agent, or Firm*—Oliff & Berridge

[57] ABSTRACT

A poly(arylene sulfide) resin composition comprised of 100 parts by weight of a resin mixture of (A) 50 to 98% by weight of a heat-treated poly(arylene sulfide) such as heat-treated polyphenylene sulfide and (B) 50 to 2% by weight of a styrene/butadiene/styrene block copolymer elastomer or a modified product thereof, and 0.2 to 10 parts by weight of an aromatic maleimide compound represented by the formula (1):

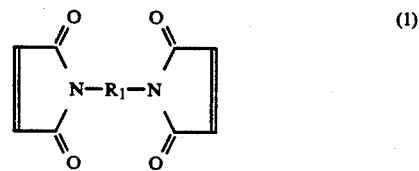

wherein $R_1$ is a phenylene-containing radical, or the formula (2):

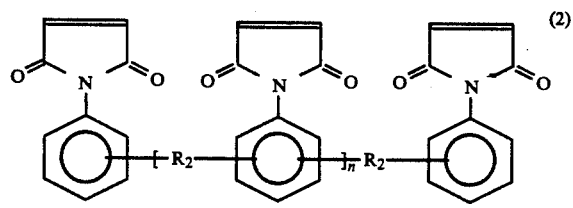

wherein $R_2$ is alkylene and n is 0, 1 or 2. The resin composition has a good impact resistance, elongation and flexibility.

7 Claims, No Drawings

POLY(ARYLENE SULFIDE) RESIN COMPOSITION

This is a continuation-in-part of application Ser. No. 07/515,571, filed Apr. 27, 1990 now abandoned.

BACKGROUND OF THE INVENTION (1) Field of the Invention

The present invention relates to a poly(arylene sulfide) resin composition comprising a mixture of a poly(arylene sulfide) resin and a thermoplastic elastomer, and incorporated therein, a small amount of a crosslinking agent. More particularly, it relates to a poly(arylene sulfide) resin composition comprising a mixture of a poly(arylene sulfide) resin and a styrene/butadiene/styrene block copolymer elastomer, and a small amount of an aromatic polyfunctional maleimide crosslinking agent.

A shaped article having a crosslinked structure, which is obtained from the poly(arylene sulfide) resin composition of the present invention, exhibits a superior impact resistance, elongation and flexibility while retaining well-balanced mechanical properties, thermal properties and shapability characteristic of the poly(arylene sulfide) resin.

(2) Description of the Related Art

Poly(arylene sulfide) resins, especially polyphenylene sulfide (hereinafter referred to "PPS") resins, are practically used as engineering plastics having a superior heat resistance, chemical resistance, rigidity and shapability. Particularly, uses of molding materials reinforced with reinforcers such as glass fibers have recently been expanded mainly in the field of injection molding for the production of electric and electronic parts and the like.

However, an unreinforced PPS resin has a problem in that the resin has a low elongation and is brittle, and therefore, the unreinforced PPS resin is not suitable for use in the field where a high impact resistance and a high flexibility are required, for example, for the production of tubes, pipes and coatings. Moreover, a PPS resin molding material reinforced with a glass fiber or the like has a problem in that the impact resistance is poor because the PPS resin per se is brittle, and therefore, uses of this molding material is currently restricted.

For the purpose of overcoming the defects of the mechanical properties of this unreinforced PPS resin, composition formed by incorporating a rubber or thermoplastic elastomer into the PPS resin have been proposed. For example, Japanese Unexamined Patent Publication No. 56-118456 discloses a composition comprising a PPS resin and incorporated therein, a block copolymer of a vinyl aromatic compound and a conjugated diene compound, and Japanese Unexamined Patent Publication No. 56-115350 and Japanese Unexamined Patent Publication No. 56-115355 disclose a composition comprising a PPS resin and incorporated therein, a modified block copolymer formed by bonding molecule units having a dicarboxylic acid group or its derivative group to the above-mentioned vinyl aromatic compound/conjugated diene compound block copolymer. Moreover, Japanese Unexamined Patent Publication No. 59-113055 discloses a composition formed by incorporating a polyamide, polyester or other thermoplastic elastomer into a PPS resin, and Japanese Unexamined Patent Publication No. 61-148268 discloses a composition formed by incorporating an ethylene/propylene/conjugated diene copolymer rubber into a PPS resin.

Considerable improving effects can be attained in the compositions disclosed in these patent publications, but the impact resistance and flexibility are not improved to desired levels. Furthermore, when the PPS resin is mixed with the above-mentioned rubber or thermoplastic elastomer, the compatibility is not completely satisfactory, and at certain mixing ratios, the appearance of the method article becomes uneven and in some cases, extreme reduction of physical properties occurs.

Japanese Unexamined Patent Publication No. 63-205358 discloses a polyphenylene sulfide composition comprising (a) a polyphenylene sulfide resin, (b) a thermoplastic resin and (c) a maleimide compound. As one example of the thermoplastic resin (b), a maleic anhydride-modified hydrogenated styrene/butadiene/styrene block copolymer is referred to in this reference. When the specified block copolymer and a maleimide compound are incorporated in a polyphenylene sulfide resin, the resultant composition has a low impact strength and elongation as compared with a composition comprised of the polyphenylene sulfide and the specified block copolymer.

SUMMARY OF THE INVENTION

The primary object of the present invention is to provide a poly(arylene sulfide) resin composition, especially a PPS resin composition, exhibiting a superior impact resistance, elongation and flexibility while retaining well-balanced mechanical properties, thermal properties and shapability characteristic of the poly(arylene sulfide) resin.

In accordance with the present invention, there is provided a poly(arylene sulfide) resin composition comprising 100 parts by weight of a resin mixture comprising (A) 50 to 98% by weight of a poly(arylene sulfide) resin which has been heat-treated and (B) 50 to 2% by weight of an elastomer, and 0.2 to 10 parts by weight of at least one compound selected from the group consisting of aromatic maleimide compounds represented by the following general formula (1):

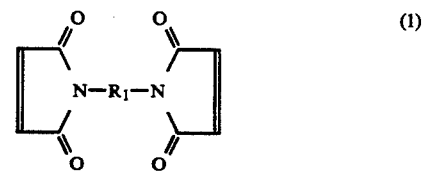

wherein $R_1$ represents

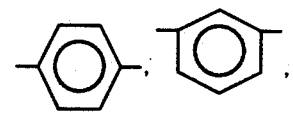

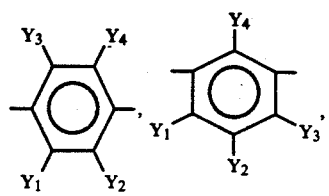

-continued

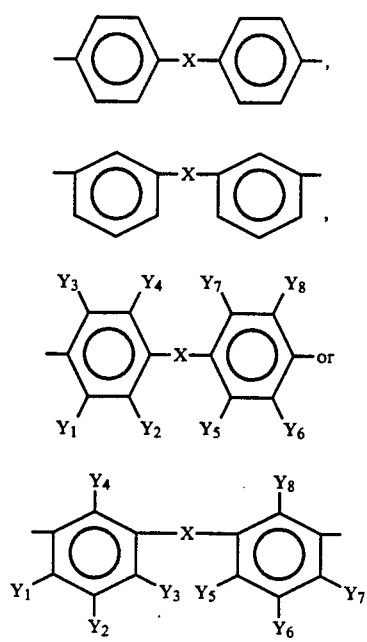

in which X is direct bond, —O—, —S—, —SO₂—, —CH₂—,

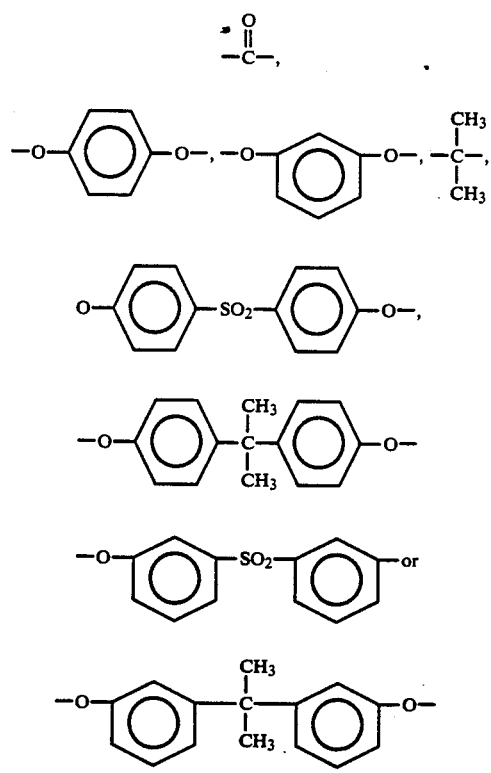

and Y₁ through Y₈ independently represents an alkyl group having 1 to 8 carbon atoms or hydrogen with the proviso that at least one of Y₁ through Y₈ in each divalent radical corresponding to R₁ is an alkyl group, and and aromatic maleimide compounds represented by the following general formula (2):

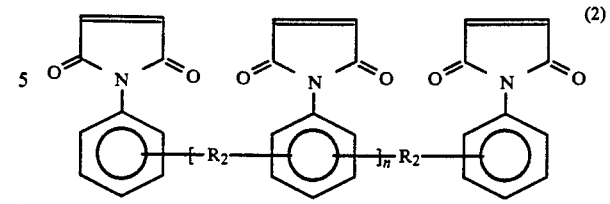

wherein $R_2$ represents an alkylene group having 1 to 8 carbon atoms, and n is 0, 1 or 2;

said elastomer being selected from the group consisting of (a) a styrene/butadiene/styrene block copolymer having a styrene content of 10 to 50% by weight, (b) a styrene/ethylene/butylene/styrene block copolymer formed by hydrogenation of the block copolymer (a), and (c) a modified block copolymer formed by adding 0.1 to 10% by weight, based on the total weight of the modified block copolymer, of an unsaturated dicarboxylic acid or an acid anhydride, ester, amide or imide thereof to the block copolymer (a) or (b).

DESCRIPTION OF THE PREFERRED EMBODIMENTS

The poly(arylene sulfide) resin used in the present invention is a polymer consisting essentially of recurring units —R—S— (in which R is an aryl group). A homopolymer having recurring units of the formula

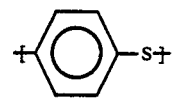

and a random copolymer or block copolymer comprising at least 70 mole %, especially at least 90 mole %, of recurring units of the above-mentioned formula, are preferably used.

As the comonomer units present in a minor proportion in the random or block copolymer, there can be mentioned other arylene groups such as an m-phenylene group

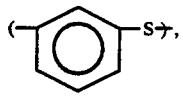

an O-phenylene group

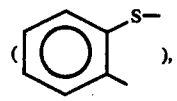

an alkyl-substituted phenylene group

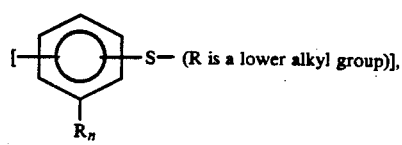

a p,p'-diphenylene-sulfone group

-continued

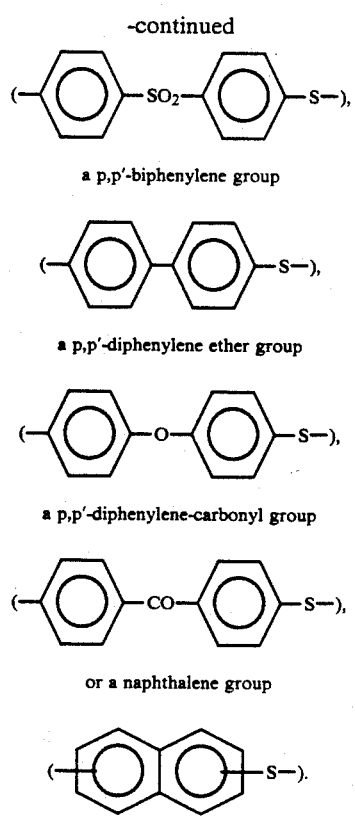

a p,p'-biphenylene group a p,p'-diphenylene ether group a p,p'-diphenylene-carbonyl group or a naphthalene group These polyarylene sulfide resins can be used in the form of mixtures of two or more thereof. Polyphenylene sulfide resins, especially poly-p-phenylene sulfide resins (hereinafter referred to as "PPS resin"), are preferable. Hereinafter, the present invention is described on PPS resin as a typical example of the polyarylene sulfide resins.

The PPS resins used in the invention include a heat-crosslinked PPS resin obtained by heating a polymer having a relatively low molecular weight, typically obtained by the process disclosed in Japanese Examined Patent Publication No. 45-3368, in an oxidizing atmosphere, or adding a crosslinking agent such as a peroxide to this polymer having a relatively low molecular weight and heating the mixture to effect crosslinking and increase the molecular weight.

The heating of the PPS resin is carried out at a temperature between about 210° C. and the melting point (i.e., about 285° C.) of the resin, preferably between about 230° C. and the melting point of the resin in an oxygen-containing atmosphere such as air. The heating time is usually from about 5 hours to about 72 hours.

The melt viscosity of the PPS resin used in the present invention is not particularly limited, as far as a shaped article can be obtained by a usual shaping method such as injection molding or extrusion. However, from the view point of the physical properties and shapability of the resin, a PPS resin having a melt viscosity of about 100 to 30,000 poise as determined at a temperature of 300° C. and a shearing rate of $10^2$ to $10^4$ $sec^{-1}$ is preferably used.

Additives such as an antioxidant, a heat stabilizer, a lubricant, a crystal nucleating agent, an ultraviolet absorber, a colorant, and a release agent can be added to the PPS resin used in the present invention according to need.

As the styrene/butadiene/styrene block copolymer elastomer (hereinafter referred to as "SBS elastomer") used in the present invention, there can be mentioned (a) a linear block copolymer or radial teleblock copolymer having a styrene content of 10 to 50% by weight, (b) a styrene/ethylene/butylene/styrene block copolymer (hereinafter referred to as "SEBS elastomer") formed by selective hydrogenation of (a), and (c) a modified block copolymer formed by adding a small amount of an unsaturated dicarboxylic acid or a derivative thereof to the block copolymer (a) or (b).

Known unsaturated carboxylic acids and derivitives thereof can be contained in the modified block copolymer (c). For example, there can be mentioned maleic acid, fumaric acid, chloromaleic acid, itaconic acid and cis-4-cyclohexane-1,2-dicarboxylic acid, and acid anhydrides, esters, amides and imides of these dicarboxylic acids. Among them, maleic acid, fumaric acid and maleic anhydride are preferably used. The content of the unsaturated dicarboxylic acid or its derivative in the modified block copolymer (c) is not particularly critical, so far as the characteristics of the SBS elastomer (a) or SEBS elastomer (b) as the substrate are not degraded, but the content of 0.1 to 10% by weight is effective and desirable. This modified block copolymer (c) is commercially available. For example, as the product formed by modifying the SEBS elastomer (b), there can be mentioned Kraton FG1901X (supplied by Shell Chemicals), and Tuftec M1911, M1913, M1943 and M1953 (supplied by Asahi Kasei Kogyo). As the product formed by modifying the SBS elastomer (a), there can be mentioned Tufprene 912 (supplied by Asahi Kasei Kogyo).

The aromatic polyfunctional maleimide (hereinafter referred to as "MI") used in the present invention is a compound represented by the following formula (1) or (2), which is obtained by dehydration reaction of an aromatic polyamino compound with maleic anhydride:

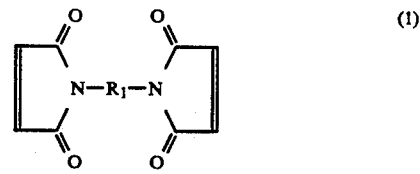

wherein $R_1$ represents

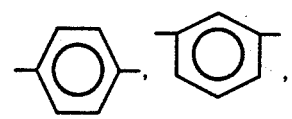

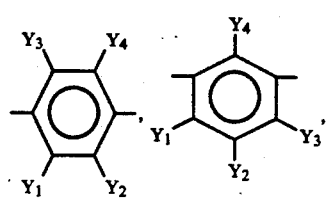

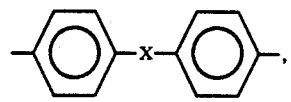

-continued

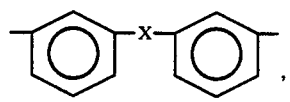

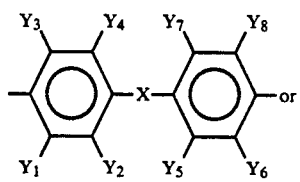, or

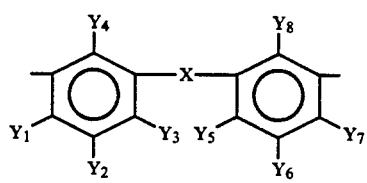

in which X is direct bond, —O—, —S—, —SO$_2$—, —CH$_2$—,

,

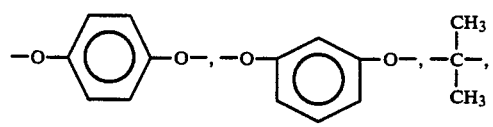

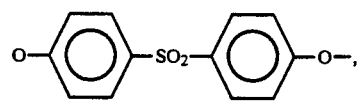,

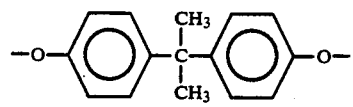

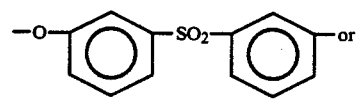 or

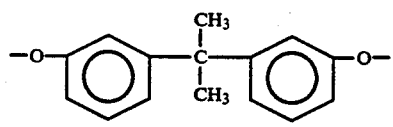

and Y$_1$ through Y$_8$ independently represents an alkyl group having 1 to 8 carbon atoms or hydrogen with the proviso that at least one of Y$_1$ through Y$_8$ in each divalent radical corresponding to R$_1$ is an alkyl group, and aromatic maleimide compounds represented by the following general formula (2):

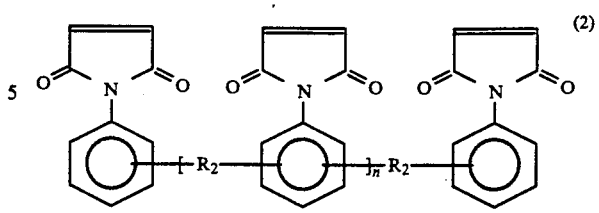

wherein R$_2$ represents an alkylene group having 1 to 8 carbon atoms, and n is 0, 1 or 2.

As specific examples of the MI compound represented by the general formula (1), there can be mentioned p-phenylene-bismaleimide, m-phenylene-bismaleimide, (2-methyl)-m-phenylene-bismaleimide, 4,4'-diphenylether bismaleimide, 4,4'-diphenylsulfide bismaleimide, 4,4'-diphenylsulfone bismaleimide, 4,4'-diphenylmethane bismaleimide, 3,3'-diphenylether bismaleimide, 3,3'-diphenylsulfide bismaleimide, 3,3'-diphenylsulfone bismaleimide, 3,3'-diphenylmethane bismaleimide, 4,4'-(2-dimethyl)-diphenylmethane bismaleimide, 4,4'-(2-diethyl)diphenylether bismaleimide, 4,4'-bi-phenylene bismaleimide, 4,4'-diphenylisopropylidene bismaleimide, 3,4'-diphenylisopropylidene bismaleimide, 1,4-bis(maleimide-4'-phenoxy)phenylene, 1,3-bis(maleimide-4"-phenoxy)phenylene, 4,4'-diphenoxy diphenylsulfone-4"-bismaleimide and 4,4'-bis(maleimide-4"-phenoxy)-diphenylsulfone. As specific examples of the MI compound represented by the general formula (2), there can be mentioned compounds in which R in the general formula (2) is —CH$_2$— or —C$_2$H$_4$—. These MI compounds can be used alone or in the form of mixtures of two or more thereof.

The resin composition of the present invention is prominently characterized in that by incorporating a small amount of an aromatic MI compound as a crosslinking agent into a resin mixture comprising a PPS resin and an SBS elastomer, crosslinking reaction and co-crosslinking reaction are caused. The details of the reaction mechanism have not been completely elucidated, but it is presumed that the reaction mechanism may probably be as follows. By Kovacic et al, it is reported that the crosslinking of a diene type unsaturated rubber such as a styrene/butadiene rubber with an MI compound as a crosslinking agent is a radical reaction, and it also is reported that this crosslinking reaction is caused at a high temperature even in the absence of a radical initiator such as an organic peroxide (see J. Am. Chem. Soc., 81, page 1190–1194, 1959).

Accordingly, supposing that the temperature is higher than the melting point (about 285° C.) of the PPS resin used in the present invention, it is considered that in the above-mentioned saturated SBS elastomer or modified SBS elastomer, radicals are formed by dehydrogenation on the main chain or the like and the crosslinking reaction with the MI compound is caused to occur. Moreover, it is presumed that the crosslinking reaction is similarly caused in the above-mentioned saturated SEBS elastomer or modified SEBS elastomer.

Also in connection with the PPS resin, it is reported by Ehlers et al that radicals are formed by dehydrogenation at the aromatic ring on the main chain and the reaction is advanced (see J. Polm. Sci., 7, page 2955, 1969). Accordingly, the crosslinking reaction can be caused between the MI compound and radicals formed on the main chain of the PPS resin during the heat tratment or during the preparation of the PPS resin composition, usually at the melt-kneading step conducted at a temperature higher than the melting point of the PPS resin. Therefore, it is presumed that if the MI compound is added to a resin mixture of the PPS resin and the SBS elastomer and melt mixing is carried out at a temperature higher than the melting point of the PPS resin, the crosslinking of the PPS resin and/or the SBS elastomer or the co-crosslinking between the PPS resin and SBS elastomer is caused. Namely, it is estimated that the component polymers dispersed in each other are crosslinked to form a network and they are mutually trapped to form a interpenetrating polymer network (abbreviated to IPN) structure or an analogous structure.

Therefore, it is considered that the MI compound has an effect of highly improving the compatibility between the above-mentioned resin and elastomer. By dint of this improved compatibility, the shaped article made from the resin composition of the present invention is characterized as having improved physical properties and in that the shaped article has a superior appearance.

As the known compound resembling the aromatic polyfunctional maleimide represented by the above-mentioned general formula (1) or (2), there can be mentioned an N-substituted monomaleimide represented by the following general formula:

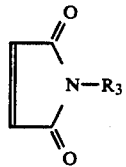

wherein $R_3$ represents 3- or 4-carboxyphenyl or 2-chlorophenyl).

If this maleimide is used, however, an effect of increasing the compatibility of the poly(arylene sulfide) resin and SBS elastomer used in the present invention is not obtained. This effect is prominently manifested selectively when the aromatic polyfunctional maleimide represented by the above-mentioned general formula (1) and/or (2) is used.

In the resin composition of the present invention, the mixing ratio between the poly(arylene sulfide) resin and the SBS elastomer is such that the amount of the poly(arylene sulfide) resin is 50 to 98% by weight, preferably 70 to 95% by weight, and the amount of the SBS elastomer is 50 to 2% by weight, preferably 30 to 5% by weight, based on the sum of the poly(arylene sulfide) resin and the SBS elastomer. If the amount of the SBS elastomer is smaller than 2% by weight, the effect of improving the impact resistance, elongation and flexibility of the poly(arylene sulfide) resin is minor, and if the amount of the SBS elastomer is larger than 50% by weight, the strength, heat resistance and rigidity of the poly(arylene sulfide) resin are degraded.

The aromatic MI compound is incorporated in an amount of 0.2 to 10 parts by weight, preferably 0.5 to 5 parts by weight, per 100 parts by weight of the resin mixture of the poly(arylene sulfide) resin and SBS elastomer. If the amount of the aromatic MI compound is smaller than 0.2 part by weight, the crosslinking and/or co-crosslinking effect is poor and hence, the above-mentioned effect of improving the physical properties is not satisfactory. If the amount of the aromatic MI compound is larger than 10 parts by weight, the crosslinking and/or co-crosslinking reaction is advanced too much, and the viscosity of the resin composition becomes too high and such troubles as reduction of the moldability and increase of generation of gases at the processing step are caused.

To improve the strength, heat resistance, rigidity and dimensional stability of the poly(arylene sulfide) resin composition of the present invention, an optional fibrous and/or particulate reinforcer can be incorporated in an amount of up to 70% by weight based on the total resin composition.

As the fibrous reinforcer, there can be mentioned inorganic fibers such as a glass fiber, a polyacrylonitrile or pitch type carbon fiber, a potassium titanate fiber, a silicon carbide fiber, an asbestos fiber, a ceramic fiber and a stainless steel fiber, and organic fibers such as an aromatic polyamide (aramid) fiber. As the particulate reinforcer, there can be mentioned kaolin, clay, bentonite, zeolite, mica, talc, wollastonite, ferrite, calcium silicate, calcium carbonate, magnesium carbonate, barium sulfate, calcium sulfate, molybdenum dioxide, graphite, gypsum, glass bead and glass balloon. Furthermore, other known reinforcers for conventional thermoplastic resins, elastomers and rubbers can be used. If necessary, the foregoing reinforcers can be used after the preliminary surface treatment with a silane coupling agent, a titanate coupling agent or an aluminate coupling agent.

Other resins can be incorporated in the poly(arylene sulfide) resin composition of the present invention without departing from the scope of the present invention. For example, there can be mentioned thermoplastic engineering plastics such as polyether sulfone, polyether etherketone, polyetherimide, polyphenylene oxide, polyphenylene ether, polysulfone, polyallylsulfone, polyacetal, polycarbonate, polyethylene terephthalate, polybutylene terephthalate, polyallylate, polyamides (nylon 6, nylon 66, nylon 610, nylon 11, nylon 12, nylon 46 and the like), fluorine resins, polyamideimides and aromatic liquid crystal polymers, polystyrene, an acrylonitrile/styrene copolymer, an acrylonitrile/styrene/butadiene copolymer, an acrylic acid ester polymer, a methacrylic acid ester polymer, polyolefins such as polymethylpentene, polyethylene, polypropylene, polybutene-1 and an ethylene/butene-1 copolymer, thermoplastic elastomers other than SBS elastomers, such as polyamide elastomers, polyester elastomers, polyolefin elastomers, an ethylene/propylene rubber, an ethylene/vinyl acetate copolymer and chlorinated polyethylene, thermosetting resins such as a bisphenol A type epoxy resin, a novolak type epoxy resin, a phenoxy resin, a phenolic resin, a polyimide, and a polyamideimide, and rubbers such as a styrene/butadiene rubber, an ethylene/propylene/diene copolymer (EPDM) rubber, a chloroprene rubber, and a silicone rubber. These resins need not participate in the reaction with the above-mentioned MI compound.

Generally, the resin composition of the present invention is once pelletized and is then used as the shaping material. The pelletizing means is not particularly critical, but according to the typical process, the poly(arylene sulfide) resin, the SBS elastomer and the aromatic MI compound are mixed together by a mixer such as a tumbler mixer or a Henschel mixer, the mixture is melt-kneaded at a temperature higher than the melting point of the poly(arylene sulfide) resin in a single-screw or twin-screw extruder, and the kneaded mixture is extruded and cut to form pellets. The melt-kneading temperature is preferably a temperature higher than the melting point of the poly(arylene sulfide) resin, that is, in the range of 285° to 340° C. If the melt-kneading temperature is lower than 285° C., the melting of the PPS resin is insufficient. If the melt-kneading temperature is higher than 340° C., extreme thermal deterioration of the SBS elastomer and decomposition of the MI compound are promoted. The time of the addition of the MI compound is not particularly critical. Generally, before the mixing of the poly(arylene sulfide) resin and the SBS elastomer, the MI compound is added to one of them, or the MI compound is added to the pre-mixed resin mixture, and the resulting composition is mixed again. To increase the yield of the MI compound in the resin at the processing, the MI compound can be charged from a supply opening arranged downstream of the extruder.

The poly(arylene sulfide) composition is mainly used for injection molding and extrusion shaping.

A shaped article obtained from the poly(arylene sulfide) resin composition has an improved impact resistance, elongation and flexibility without loss of the balance of various properties characteristics of the poly(arylene sulfide) resin, especially the PPS resin.

The present invention will now be described in detail with reference to the following examples that by no means limit the scope of the invention.

Examples 1 through 4

Heat-crosslinked PPS resin powder (A) was used as the poly(arylene sulfide) resin. Namely, heat-treated PPS resin powder, Tohpren "T-4" powder (hereinafter referred to as "T-4") having a melt viscosity of 1,900 poise, obtained by heat-treating non-heat-treated PPS resin powder, Tohpren "T-1" (supplied by Tohpren, melt viscosity: 250 poise), in a circulating oven maintained at 240° C. for 8 hours, was heat-treated again in the oven maintained at 240° C. for 15 hours to increase the melt viscosity to 10,000 poise, and the heat-treated PPS resin powder having the thus increased melt viscosity was used. A resin mixture was prepared by mixing 90% by weight of this PPS resin powder (A) with 10% by weight of an SBS elastomer (B) shown in Table 1 for 5 minutes in a tumbler blender. Then, 2 parts by weight of N,N'-m-phenylene-bismaleimide (Balnoc PM supplied by Ohuchi Shinko Kagaku Kogyo, melting point=200° C. or higher, specific gravity=1.44, molecular weight=268.23) was added as the aromatic MI compound to 100 parts by weight of the obtained resin mixture. The resulting composition was mixed again for 20 minutes by the above-mentioned blender to obtain about 10 kg of a mixture.

TABLE 1

| Example No. | Abbreviation | SBS Elastomer (B) Name | Used Brand and Lot | Styrene Content (% by weight) |
|---|---|---|---|---|
| 1 | SBS | styrene/butadiene/styrene block copolymer | Asahiprene T430 (supplied by Asahi Kasei Kogyo) | 30 |
| 2 | SEBS | hydrogenation product of elastomer of Example 1 | Tuftec H1041 (supplied by Asahi Kasei Kogyo) | 30 |
| 3 | SBS-M | malei anhydride-modified SBS* | Tufprene 912 (supplied by Asahi Kasei Kogyo) | 40 |
| 4 | SEBS-M | maleic anhydride-modified SEBS* | Tuftec M1913 (supplied by Asahi Kasei Kogyo) | 30 |

Note
*the amount of maleic anhydride used for modification was about 1% by weight The above mixture was melt-kneaded at a temperature of 300° C. by using a small twin-screw extruder (L/D=20, full-flighted screw was used) and extruded in the form of a strand, and the strand was cooled with water and cut to form pellets.

Test pieces for the tensile test, heat distortion temperature test, and Izod impact test were prepared by using an injection molding machine having a clamping force of 75 tons. The molding conditions adopted were a cylinder temperature of 300° C., a mold temperature of 120° C., an injection time of 1.6 seconds, a pressure-dwelling time of 20 seconds, and a cooling time of 30 seconds.

The melt viscosity mentioned above was measured under conditions of an L/D ratio of 10, a temperature of 300° C., and a load of 50 kgf by using a capillary flow tester (Model CFT-500 supplied by Shimadzu Corp.). The melt viscosity described hereinafter was determined under these conditions.

Comparative Examples 1 through 5

In Comparative Example 1, the pelletization and injection molding were carried out in the same manner as described in Examples 1 through 4 except that the PPS resin powder (A) alone was used, i.e., the SBS elastomer was not used. In Comparative Examples 2 through 5, the procedures of Examples 1 through 4 were repeated in the same manner except that the aromatic MI compound was not added.

The evaluation results obtained in the foregoing examples are shown in Table 2.

From these results, it is obvious that when the present invention is carried out by using N,N'-m-phenylene-bismaleimide, one of aromatic polyfunctional bismaleimide compounds, the elongation and impact resistance of the resin mixture can be improved without substantial degradation of the heat resistance, strength and shapability characteristic of the unreinforced PPS resin, and a molded article having a good appearance is obtained.

Among the mixed SBS elastomers, SBS-M and SEBS-M elastomers formed by modification with an unsaturated carboxylic acid exhibited a relatively higher effect.

TABLE 2

| | PPS resin | Resin composition (% by weight) SBS elastomer | SEBS elastomer | SBS-M elastomer | SEBS-M elastomer | Amount of MI compound per 100 parts by weight of resin (parts by weight) | Tensile strength (kg/cm$^2$) | Elongation at break (%) | Izod impact strength (¼" notch) (kg·cm/cm$^2$) | Best distortion temperature under 18.56 kg/cm$^2$ (°C.) | Injection molding pressure (kg/cm$^2$) | Appearance of molded article *2 |
|---|---|---|---|---|---|---|---|---|---|---|---|---|
| Comparative Example 1 | 100 | — | — | — | — | — | 700 | 2.4 | 1.2 | 107 | 520 | A |
| Example 1 | 90 | 10 | — | — | — | 2 | 640 | 4.0 | 2.4 | 105 | 410 | B-A |
| Example 2 | 90 | — | 10 | — | — | 2 | 430 | 3.7 | 2.3 | 105 | 410 | B-A |
| Example 3 | 90 | — | — | 10 | — | 2 | 630 | 4.3 | 2.4 | 105 | 410 | A |
| Example 4 | 90 | — | — | — | 10 | 2 | 650 | 4.5 | 2.4 | 105 | 410 | A |
| Comparative Example 2 | 90 | 10 | — | — | — | — | 610 | 2.5 | 2.9 | 104 | 410 | C-D |
| Comparative Example 3 | 90 | — | 10 | — | — | — | 620 | 2.4 | 2.8 | 104 | 410 | D |
| Comparative Example 4 | 90 | — | — | 10 | — | — | 625 | 2.6 | 2.9 | 104 | 410 | C |
| Comparative Example 5 | 90 | — | — | — | 10 | — | 620 | 2.8 | 2.9 | 104 | 410 | C |

Note
*1 The tensile strength, elongation at break and Izod impact strength were determined according to ASTM D638, ASTM D256 and ASTM D648 (under high load of 18.56 kg/cm$^2$), respectively.
*2 The appearance of the molded article was evaluated according to the following rating.
D: conspicuos color unevenness on the surface of the molded article
C: certain mitigation of color unevenness
B: such color unevenness as judged as "practically usable"
A: good appearance of no color unevenness, judged as being equivalent to surface of molded article composed solely of PPS resin Examples 5 through 8 and Comparative Examples 6 and 7

The procedures of Examples 1 through 4 were repeated in the same manner except that maleic anhydride-modified SEBS-M (Kraton FG1901X supplied by Shell Chemicals, maleic anhydride content=2% by weight, styrene content=28% by weight) was used as the SBS elastomer and the amount added of N,N'-m-phenylene-bismaleimide was changed. The results are shown in Table 3.

From the results shown in Table 3, it is obvious that the preferable range of the amount incorporated of the aromatic MI compound in the present invention is from 0.2 to 10 parts by weight.

TABLE 3

| | Resin composition (% by weight) PPS resin | SEBS-M | Amount of MI compound per 100 parts by weight of resin (parts by weight) | Tensile strength (kg/cm$^2$) | Elongation at break (%) | Heat distortion temperature under 18.56 g/cm$^2$ (°C.) | Melt viscosity at 300° C. (poise) | Injection molding pressure (kg/cm$^2$) | Injection moldability *1 | Appearance of molded article | |
|---|---|---|---|---|---|---|---|---|---|---|---|
| Comparative Example 6 | 90 | 10 | 0.1 | 620 | 2.7 | 104 | 1,310 | 410 | A | C | Light brown |
| Example 5 | 90 | 10 | 0.2 | 620 | 3.5 | 104 | 1,530 | 410 | A | A | * |
| Example 6 | 90 | 10 | 2 | 640 | 4.3 | 105 | 2,750 | 430 | A | A | Chocolate color |
| Example 7 | 90 | 10 | 5 | 680 | 4.8 | 106 | 5,530 | 480 | A | A | Reddish chocolate color |
| Example 8 | 90 | 10 | 10 | 700 | 5.0 | 106 | 10,100 | 540 | B | A | * |
| Comparative | 90 | 10 | 12 | 720 | 5.2 | 106 | 13,500 | 610 | C | C | * |

TABLE 3-continued

| | Resin composition (% by weight) | | Amount of MI compound per 100 parts by weight of resin (parts by weight) | Tensile strength (kg/cm²) | Elongation at break (%) | Heat distortion temperature under 18.56 g/cm² (°C.) | Melt viscosity at 300° C. (poise) | Injection molding pressure (kg/cm²) | Injection moldability *1 | Appearance of molded article |
|---|---|---|---|---|---|---|---|---|---|---|
| | PPS resin | SEBS-M | | | | | | | | |
| Example 7 | | | | | | | | | | |

Note
*1 The injection moldability was evaluated according to the following rating.
A: satisfactory
B: generation of gas
C: considerable generation of gas, contamination of mold, fogging of molded article Examples 9 through 11 and Comparative Examples 8 and 9

The procedures of Examples 1 through 4 were repeated in the same manner except that SEBS-M (Tuftec M1913 supplied by Asahi Kasei Kogyo) was used as the SBS elastomer and the mixing ratio of the SBS elastomer to the PPS resin was changed. The results are shown in Table 4.

In Comparative Example 8, the elongation and impact resistance were highly improved, but the tensile strength, heat distortion temperature, and appearance were poor. In Comparative Example 9, the effect of improving the elongation and impact resistance was insufficient. The products obtained in these comparative examples could be satisfactorily practically used for certain purposes. However, it is obvious that the products of these examples fail to answer the intended object of the present invention, that is, attainment of the effect of improving the elongation and impact resistance without degradation of the inherent characteristics of the unreinforced PPS resin.

Examples 12 through 15 and Comparative Examples 10 and 11

The procedures of Examples 1 through 4 were repeated in the same manner except that a PPS resin powder having a melt viscosity of 2,500 poise, which was obtained by heat-treating a non-heat-treated PPS resin powder, Tohpren "T-1" (supplied by Tohpren, melt viscosity=400 poise), was used as the PPS resin powder, SEBS-M (Tuftec M-1913 supplied by Asahi Kasei Kogyo) was used as the SBS elastomer, the mixing ratio between the PPS resin and the SBS elastomer was changed to PPS resin/SEBS-M weight ratio of 75/25, and the kind and amount of the aromatic MI compound were changed. The results are shown in Table 5.

Where the MI compound was not added as in Comparative Example 10 or a monofunctional MI compound was used as the MI compound as in Comparative Example 11, the compatibility of the resin mixture was poor and the appearance of the molded article was degraded, and therefore, the molded article could not be put into practical use. In contrast, if the polyfunctional MI compound is used as the MI compound as in Examples 12 and 15, various physical properties were improved and a molded article having a good appearance was obtained. Especially, if the MI compound represented by general formula (2) was used, the effect of improving the elongation and impact strength was enhanced.

TABLE 4

| | Resin composition (% by weight) | | Amount of MI compound per 100 parts by weight of resin (parts by weight) | Tensile strength (kg/cm²) | Elongation at break (%) | Izod impact strength (¼" notch) (kg · cm/cm²) | Heat distortion temperature under 18.56 kg/cm² (°C.) | Appearance of molded article |
|---|---|---|---|---|---|---|---|---|
| | PPS resin | SEBS-M | | | | | | |
| Comparative Example 8 | 40 | 60 | 2 | 200 | 35.0 | 5.8 | 80 | C |
| Example 9 | 50 | 50 | 2 | 280 | 20.0 | 4.0 | 88 | C-B |
| Example 10 | 70 | 30 | 2 | 420 | 11.5 | 2.8 | 98 | B |
| Example 4 | 90 | 10 | 2 | 650 | 4.5 | 2.4 | 105 | A |
| Example 11 | 95 | 5 | 2 | 680 | 3.0 | 1.8 | 106 | A |
| Comparative Example 9 | 99 | 1 | 2 | 700 | 2.5 | 1.2 | 107 | A |

TABLE 5

| | MI compound | Amount per 100 parts by weight of resin (parts by weight) | Tensile strength (kg/cm²) | Elongation at break (%) | Izod impact strength (¼" notch) (kg · cm/cm) | Heat distortion temperature under 18.56 kg/cm² (°C.) | Appearance of molded article |
|---|---|---|---|---|---|---|---|
| Comparative Example 10 | — | — | 420 | 5.5 | 3.2 | 100 | D |
| Comparative Example 11 | Monofunctional OCA-MI *1 | 1 | 490 | 8.6 | 2.5 | 100 | D |
| Example 12 | Bifunctional BMI-S *2 | 1 | 420 | 6.3 | 2.7 | 99 | A |

TABLE 5-continued

| | MI compound | Amount per 100 parts by weight of resin (parts by weight) | Tensile strength (kg/cm$^2$) | Elongation at break (%) | Izod impact strength (¼" notch) (kg · cm/cm) | Heat distortion temperature under 18.56 kg/cm$^2$ (°C.) | Appearance of molded article |
|---|---|---|---|---|---|---|---|
| Example 13 | Bifunctional BMI-MP *3 | 1 | 410 | 6.1 | 2.8 | 99 | A |
| Example 14 | Polyfunctional BMI-M20 | 1 | 410 | 8.0 | 4.0 | 99 | A |
| Example 15 | Polyfunctional BMI-M20 | 5 | 460 | 9.3 | 6.5 | 100 | A |

Note
*1: 2-chlorophenyl-monomaleimide

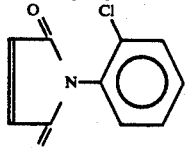

*2: 4,4'-diphenylmethane-bismaleimide

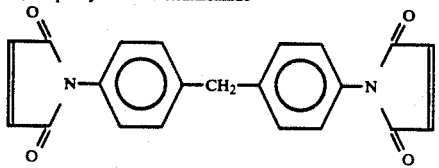

*3: N,N'-m-phenylene-bismaleimide

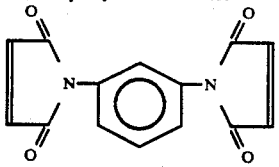

*4:

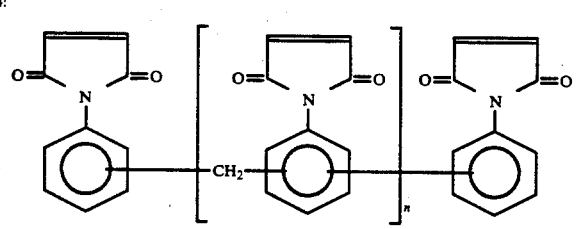

Each compound is supplied by Mitsui-Toatsu Chem.

Compatibility Test

With respect to each of the samples obtained in Examples 2, 4, 12 and 14 and Comparative Examples 3 and 5, a disc having a diameter of 100 mm and a thickness of 3 mm was prepared by using the above-mentioned injection molding machine, and the abrasion resistance test was carried out by using a Taber abrasion tester and the compatibility was evaluated. The results are shown in Table 6.

When the MI compound was not incorporated, a large volume loss was observed, and granules deemed to be composed of the elastomer were peeled from the surface of the disc during the abrasion test and a pitted surface was formed on the disc. On the other hand, when the MI compound was incorporated, the volume loss was relatively small, and the abrasion surface had an appearance as uniform as that of the machined surface.

Note, the Taber abrasion test was carried out according to JIS K-9204 under the following conditions.

Load: 1,000 g
Driving wheel: CS-17/60 rpm
Environment: 23° C./50% RH

Taber volume loss: calculated from the weight of disc before and after 1,000 revolutions of turn table at sliding abrasion test

TABLE 6

| | Resin composition (% by weight) | | | Amount of MI compound per 100 parts by weight of resin (parts by weight) | Taber volume loss (mg/1000 revolutions) |
|---|---|---|---|---|---|
| | PPS resin | SEBS | SEBS-M | | |
| Comparative Example 3 | 90 | 10 | — | — | 129.0 |
| Example 2 | 90 | 10 | — | 2 | 42.8 |
| Comparative Example 5 | 90 | — | 10 | — | 56.5 |
| Example 4 | 90 | — | 10 | 2 | 32.3 |
| Example 12 | 75 | — | 25 | 1 | 39.2 |
| Example 14 | 75 | — | 25 | 1 | 35.5 |

Example 16 and Comparative Examples 12, 13 and 14

By substantially the same procedure as described in Example 8, PPS resin compositions were prepared and the properties were tested wherein the resin compositions were varied as shown in Table 7 with all other conditions remaining substantially the same. The results are shown in Table 7.

TABLE 7

|  | Comparative Example 12 | Comparative Example 13 | Comparative Example 14 | Example 16 |
|---|---|---|---|---|
| PPS A *1 (wt. %) | — | — | 80 | 80 |
| PPS B *2 (wt. %) | 80 | 80 | — | — |
| SBS Copolymer *3 (wt. %) | 20 | 20 | 20 | 20 |
| Bismaleimide *4 (wt. %) | — | 2 | — | 2 |
| Appearance | Poor*5 | Good | Poor*5 | Good |
| Tensile strength (kg/cm²) | 601 | 471 | 599 | 490 |
| Tensile elongation at break (%) | 10.6 | 5.2 | 3.5 | 5.8 |
| Izod impact strength *6 (kg · cm/cm²) | Not broken | 23 | 34 | 35 |
| Heat distortion temperature (°C.) | 104 | 102 | 106 | 107 |

*1 Heat-treated PPS resin prepared by heat-treating a non-heat-treated PPS resin (melt viscosity: 400 poise) at 240° C.
*2 Non-heat-treated PPS resin (melt viscosity: 400 poise)
*3 Maleic anhydride-modified hydrogenated styrene/butadiene/styrene block sopolymer (Tuftec M-1913 supplied by Asahi Kasei Kohyo K.K.)
*4 N.N'-m-phenylene-bismaleimide (Balnoc PM supplied by Ohuchi Shinko Chem. Ind. Co.)
*5 The product had a pearl-like appearance and phase separation occurred.
*6 Izod impact strength, not notched, 1/6"

As seen from Table 7, when a bismaleimide compound was not incorporated (Comparative Example 12 and Comparative Example 14), the products had a pearl-like appearance and undesirable phase separation occurred. This means that the resin compositions were not completely homogeneous. In contrast, when a bismaleimide compound was incorporated (Comparative Example 13 and Example 16), the resin compositions were homogeneous and the injection molded products had a good appearance.

The product of Comparative Example 13 had a very low elongation and a very low impact strength as compared with those of the product of Comparative Example 12. In contrast, the product of Example 16 had a high elongation and approximately the same impact resistance as compared with those of Comparative Example 14.

It would be surprising that the elongation and impact strength of a non-heat-treated PPS/elastomer composition are reduced by incorporating a bismaleimide compound, but the elongation of a heat-treated PPS/elastomer is increased and the impact resistance of the heat-treated PPS/elastomer is not varied (or is increased although only to a very minor extent) by incorporating a bismaleimide compound.

We claim:

1. A poly(arylene sulfide) resin composition comprising 100 parts by weight of a resin mixture composed of (A) 50 to 98% by weight of a poly(arylene sulfide) resin which has been heat-treated at a temperature between about 210° C. and the melting point of the poly(arylene) sulfide resin in an oxygen containing atmosphere and (B) 50 to 2% by weight of an elastomer, and 0.2 to 10 parts by weight of at least one compound selected from the group consisting of aromatic maleimide compounds represented by the following general formula (1):

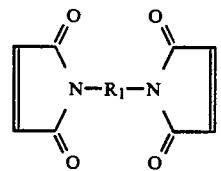
(1)

wherein $R_1$ represents

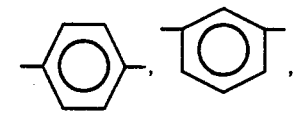

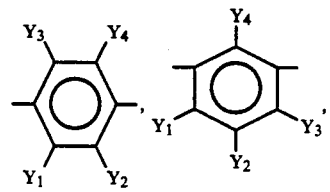

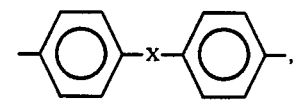

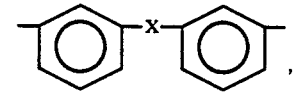

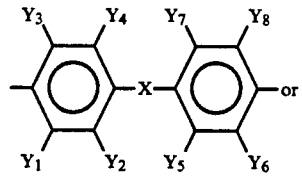

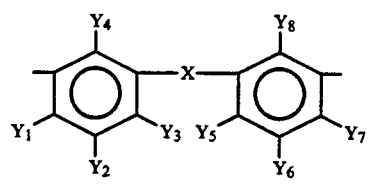

in which X is direct bond, —O—, —S—, —SO$_2$—, —CH$_2$—,

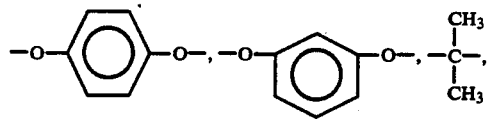

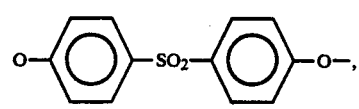

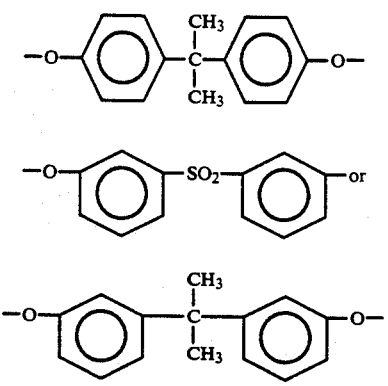

and $Y_1$ through $Y_8$ independently represents an alkyl group having 1 to 8 carbon atoms or hydrogen with the proviso that at least one of $Y_1$ through $Y_8$ in each divalent radical corresponding to $R_1$ is an alkyl group, and aromatic maleimide compounds represented by the following general formula (2):

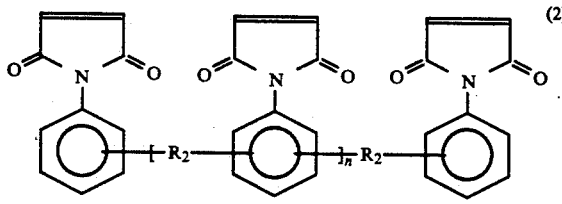

wherein $R_2$ represents an alkylene group having 1 to 8 carbon atoms, and n is 0, 1 or 2;

said elastomer being selected from the group consisting of (a) an unmodified styrene/butadiene/styrene block copolymer having a styrene content of 10 to 50% by weight, (b) a styrene/ethylene/butylene/styrene block copolymer formed by hydrogenation of the block copolymer (a), and (c) a modified block copolymer formed by adding 0.1 to 10% by weight, based on the total weight of the modified block copolymer, of an unsaturated dicarboxylic acid or an acid anhydride, ester, amide or imide thereof to the block copolymer (a) or (b).

2. The poly(arylene sulfide) resin composition according to claim 1, wherein the poly(arylene sulfide) resin is a polyphenylene sulfide homopolymer composed of recurring units represented by the following formula (3):

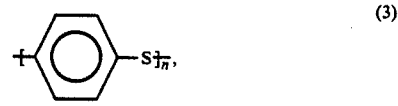

or a polyphenylene sulfide random or block copolymer which random or block copolymer comprises at least 70% by mole of recurring units represented by the formula (3).

3. The poly(arylene sulfide) resin composition according to claim 2, wherein the polyphenylene sulfide has a melt viscosity of about 100 to 30,000 poise as determined at a temperature of 300° C. and a shearing rate of $10^2$ to $10^4$ sec$^{-1}$.

4. The poly(arylene sulfide) resin composition according to claim 1, wherein the poly(arylene sulfide) resin has been heat-treated at a temperature between about 230° C. and the melting point of the poly(arylene sulfide) resin in air.

5. The poly(arylene sulfide) resin composition according to claim 1, wherein the aromatic maleimide compound represented by the formula (1) is selected from the group consisting of p-phenylene-bismaleimide, m-phenylene-bismaleimide, (2-methyl)-m-phenylene-bis-maleimide, 4,4'-diphenylether bismaleimide, 4,4'-diphenylsulfide bismaleimide, 4,4'-diphenylsulfone bismaleimide, 4,4'-diphenylmethane bismaleimide, 3,3'-diphenylether bismaleimide, 3,3'-diphenylsulfide bismaleimide, 3,3'-diphenylsulfone bismaleimide, 3,3'-diphenylmethane bismaleimide, 4,4'-(2-dimethyl)-diphenylmethane bismaleimide, 4,4'-(2-diethyl)diphenyl-ether bismaleimide, 4,4'-biphenylene bismaleimide, 4,4'-diphenylisopropylidene bismaleimide, 3,4'-diphenyl-isopropylidene bismaleimide, 1,4-bis-(maleimide-4'-phenoxy)phenylene, 1,3-bis(maleimide-4"-phenoxy)-phenylene, 4,4'-diphenoxydiphenylsulfone-4"-bismaleimide and 4,4'-bis(maleimide-4"-phenoxy)-diphenylsulfone.

6. The poly(arylene sulfide) resin composition according to claim 1, wherein $R_2$ in the formula (2) is a methylene or ethylene group.

7. The poly(arylene sulfide) resin composition according to claim 1, which comprises 100 parts by weight of a resin mixture comprising (A) 70 to 95% by weight of the poly(arylene sulfide) resin and 30 to 5% by weight of the elastomer, and 0.5 to 5 parts by weight of the aromatic maleimide compound.

* * * * *